United States Patent [19]

Doan

[11] Patent Number: 5,390,545
[45] Date of Patent: Feb. 21, 1995

[54] APPARATUS FOR MEASURING TORSIONAL VIBRATIONS OF ROTATING MACHINERY

[75] Inventor: Tien D. Doan, Peoria, Ill.

[73] Assignee: Caterpillar Inc., Peoria, Ill.

[21] Appl. No.: 2,557

[22] Filed: Jan. 11, 1993

[51] Int. Cl.⁶ .............................................. G01H 1/10
[52] U.S. Cl. ........................................ 73/650; 73/660; 364/508
[58] Field of Search ................... 73/650, 660, 862.324, 73/862.325, 862.326; 364/508, 551.02; 340/680, 683

[56] References Cited

U.S. PATENT DOCUMENTS

| | | |
|---|---|---|
| 2,991,618 | 7/1961 | Marscher et al. ............ 73/650 |
| 3,885,420 | 5/1975 | Wolfinger ..................... 73/650 |
| 4,250,758 | 2/1981 | Pitts, Jr. et al. ............. 73/650 |
| 4,347,571 | 8/1982 | Leung et al. ................ 73/650 |

FOREIGN PATENT DOCUMENTS 0166428  12/1981  Japan ............................. 73/650

OTHER PUBLICATIONS

Publication: "Torsional Vibration Measurements in the Preventive Maintenance of Rotating Machinery", Harold Herschkowitz, Fourth in a Series of Technology Interchange on Machinery Vibration Monitoring and Analysis, published by The Vibration Institute.

Primary Examiner—Hezron E. Williams
Assistant Examiner—Nashmiya Ashraf
Attorney, Agent, or Firm—David M. Masterson

[57] ABSTRACT

An apparatus for measuring torsional vibrations of rotating machinery is provided. A wheel having a plurality of spaced apart teeth is connected to the rotating machinery. A sensor detects the speed of wheel rotation and responsively produces a speed signal that has a frequency proportional to the rotational wheel speed. A timing device receives the speed signal, determines the period of the most recent pulse of the speed signal, and responsively produces an instantaneous period signal that has a value representative of the determined period. A microprocessor receives the instantaneous period signal, determines an instantaneous speed value of the rotating wheel and an average speed value of the rotating wheel based on previous wheel rotations. The microprocessor further produces an instantaneous torsional velocity signal that has a value equal to the difference of the average speed value and the instantaneous speed value, and an instantaneous torsional displacement signal in response to numerically integrating the torsional velocity signal value. Finally, an output device receives the instantaneous torsional signals and displays the representative values.

15 Claims, 9 Drawing Sheets

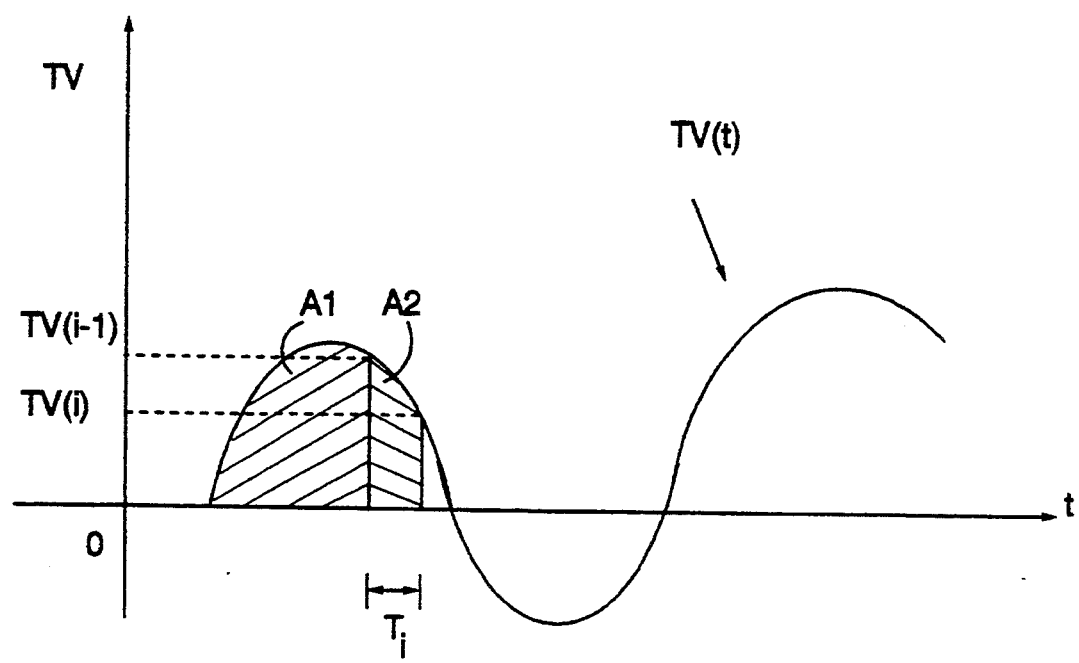
Fig_7_
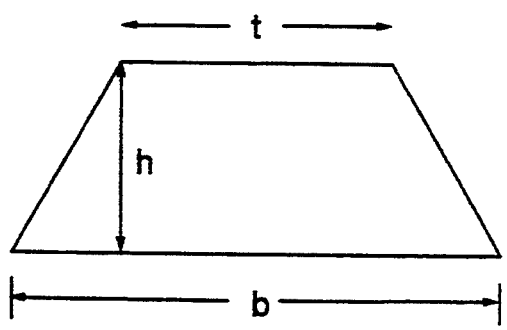
Fig_8_

APPARATUS FOR MEASURING TORSIONAL VIBRATIONS OF ROTATING MACHINERY

TECHNICAL FIELD

This invention relates generally to an apparatus for measuring torsional vibrations of rotating machinery and, more particularly, to an apparatus for measuring torsional vibrations of rotating machinery that produces torsional velocity and displacement signals.

BACKGROUND ART

A mechanical system is a tuned network, the response of which is dependent upon mass, stiffness, and damping. When a system is not tuned properly, periodic or aperiodic torques may produce torsional vibrations. Excessive torsional vibrations may cause such detrimental effects as broken shafts, mutilated gears, and cracks in couplings and flange bolts. However unlike translational vibrations, which cause noise and shaking that are easy to detect, torsional vibrations are difficult to detect because the vibrations are generally not noticed until a component breaks down.

One method that attempts to detect torsional vibration is described in a "Technology Interchange" publication published by the Vibration Institute entitled, "Torsional Vibration Measurements in the Preventive Maintenance of Rotating Machinery" authored by Harold Hershkowitz. Here, a magnetic pickup sensor is used to produce an input signal that has a frequency proportional to the angular velocity of a rotating shaft. The input signal is delivered to a Frequency-to-Voltage convertor that produces an output voltage proportional to the shaft velocity. The fluctuations in the output voltage represent the torsional velocity of the shaft. The fluctuations in the output voltage is integrated to produce an angular displacement signal that is representative of the torsional vibration.

However, the angular displacement signal includes spurious signal components that have nothing to do with the torsional vibration. Thus, the unwanted components must be filtered-out or attenuated using high and low pass filters. Unfortunately, the filters that adequately attenuate the unwanted components do so in a slow fashion as compared to the torsional vibrational response of the system. Thus, much of the data produced by such a measurement system is erroneous and not acceptable for design and analysis purposes.

The present invention is directed to overcoming one or more of the problems as set forth above.

Disclosure of the Invention

In one aspect of the present invention, an apparatus for measuring torsional vibrations of rotating machinery is provided. A wheel having a plurality of spaced apart teeth is connected to the rotating machinery. A sensor detects the speed of wheel rotation and responsively produces a speed signal that has a frequency proportional to the rotational wheel speed. A timing device receives the speed signal, determines the period of the most recent pulse of the speed signal, and responsively produces an instantaneous period signal that has a value representative of the determined period. A microprocessor receives the instantaneous period signal, determines an instantaneous speed value of the rotating wheel and an average speed value of the rotating wheel based on previous wheel rotations. The microprocessor further produces an instantaneous torsional velocity signal that has a value equal to the difference of the average speed value and the instantaneous speed value, and an instantaneous torsional displacement signal in response to numerically integrating the torsional velocity signal value. Finally, an output device receives the instantaneous torsional signals and displays the representative values.

BRIEF DESCRIPTION OF THE DRAWINGS

For a better understanding of the present invention, reference may be made to the accompanying drawings in which:

FIG. 7 is a diagram illustrating the magnitude of a torsional velocity signal associated with the present invention;

FIG. 8 is a diagram illustrating an area of the torsional velocity signal;

BEST MODE FOR CARRYING OUT THE INVENTION

Figure 1:
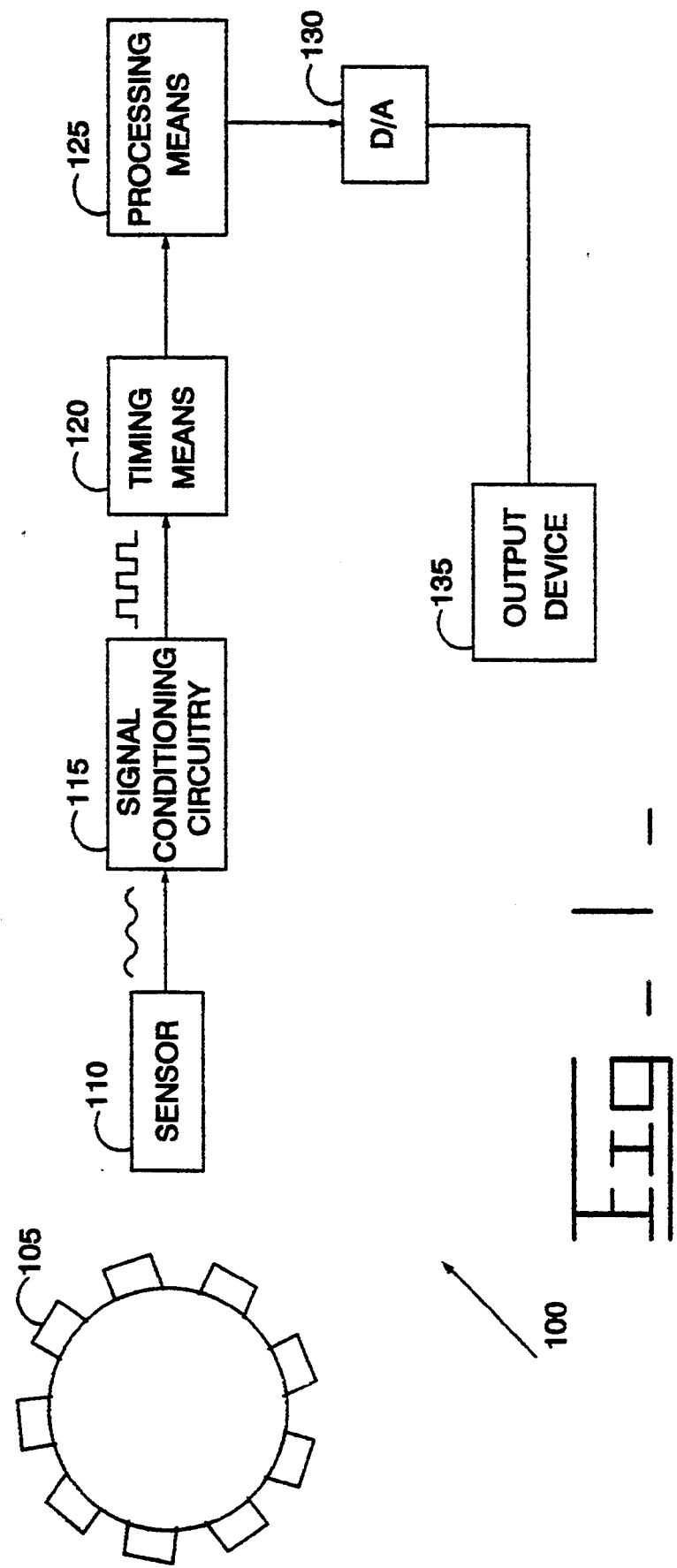
FIG. 1 is a functional block diagram of an embodiment of the present invention that is adapted to measure torsional vibrations of rotating machinery including a processing means.

With reference to FIG. 1, the present invention provides an apparatus 100 for measuring torsional vibrations of rotating machinery. The apparatus may be referred to as a torsiograph. A wheel 105 having a plurality of spaced apart teeth is connected to and rotating with the rotating machinery (not shown). The wheel 105 may be connected to the machinery by a shaft in a well known manner. The machinery may include such mechanical devices as a crankshaft, cam shaft, load gearbox, clutch or the like. Moreover, the wheel 105 may include such mechanical objects as a ring gear, camshaft gear, or the like.

A sensor 110 is adapted to detect the angular rotation of the wheel 105 and responsively produce a speed signal. The speed signal has a frequency proportional to the angular or rotational speed of the wheel 105. A magnetic pickup sensor in combination with a ferrous wheel is commonly utilized to produce the speed signal. The sensor 110 may also include eddy current proximity probes or encoders, or optical probes or encoders, for example.

Depending upon the type of sensor 110, the sensor 110 may produce either a sinusoidal or pulse-train signal. With either type of signal, it may be desirable to condition the signal. The block that performs this function is depicted by block 115. The signal conditioning circuitry illustrated by block 115 serves as an interface between analog and digital circuitry. For example, the conditioning circuitry 115 may convert a speed signal having a sinusoidal waveform into a speed signal having a periodic pulse. However if a speed signal is produced with a periodic pulse, then the conditioning circuitry 115 may "sharpen" the rising and falling edges of the periodic pulse. The conditioning circuitry 115 is adapted to convert speed signals having arbitrary waveforms into TTL level signals. The conditioning circuitry 115 may perform several functions including isolation, amplitude limiting, level comparison, and TTL level shifting. This general type of conditioning circuitry is well known in the art and the particular circuit design is not critical to the present invention.

A timing means 120 receives the conditioned speed signal and determines the period of the most recent pulse of the speed signal. Responsively, the timing means 120 produces an instantaneous period signal having a value representative of the determined period.

A processing means 125 receives the instantaneous period signal and determines an instantaneous speed value and an average speed value of the rotating wheel. The processing means 125 then produces an instantaneous torsional velocity signal having a value equal to the difference of the average speed value and the instantaneous speed value. Finally, the processing means 125 produces an instantaneous torsional displacement signal in response to numerically integrating the torsional velocity signal value.

A Digital to Analog (D/A) signal converting device 130 receives the instantaneous torsional velocity and displacement signals and converts the instantaneous torsional signals from digital signals to analog signals. For example, the D/A signal converting device is similar to the manufactured by Analog Devices as product no. AD664. Further, it may be desirable to filter the analog signals with conventional filtering circuitry. As apparent to those skilled in the art, the D/A signal converting device 130 or filtering circuitry are not required. The instantaneous torsional signals provide the desired information in digital form.

An output device 135 receives the instantaneous torsional signals and displays the representative values. For example, the output device 135 may include an analog plotter, chart recorder, oscilloscope, or the like. Further, the output device 135 may be adapted to record the data for later analysis.

Figure 2:
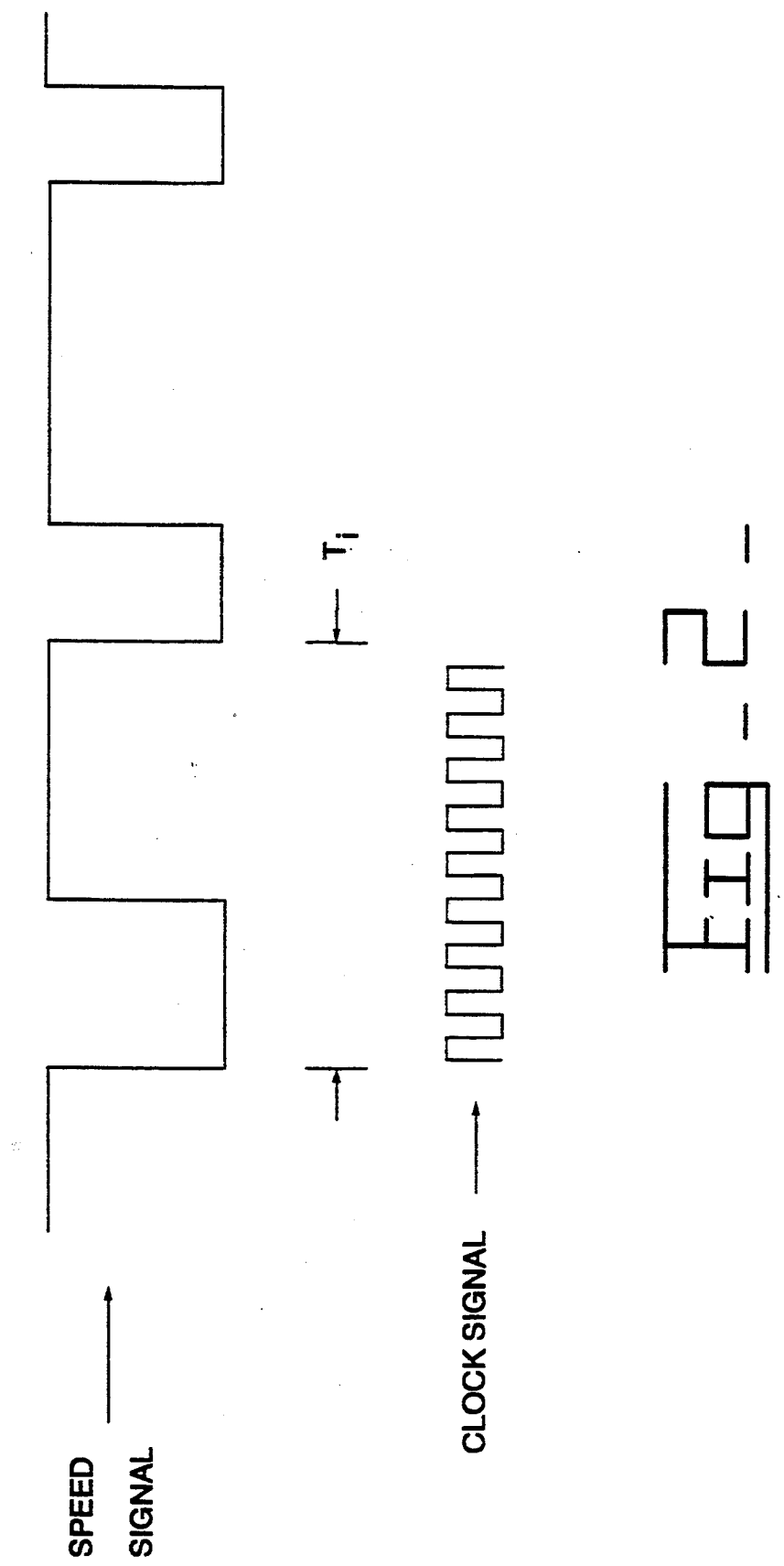
FIG. 2 is a diagram illustrating a speed and clock signal associated with an embodiment of the present invention.

The operation of the timing means 120 will now be discussed with reference to FIG. 2. The timing means 120 includes a programmable microprocessor similar to that provided by Advanced Micro Devices as product no. AM9513A. The timing means 120 includes an internal clock for producing a clock signal having a periodic pulse train. The timing means 120 counts the number of clock pulses that occur between each "falling edge" of the speed signal. The number of clock pulses represents a value that is proportional to the period of the speed signal. Advantageously, the timing means 120 produces the instantaneous period signal with a value (number of clock pulses) that is representative of the instantaneous period signal value, $T_i$.

Figure 3:
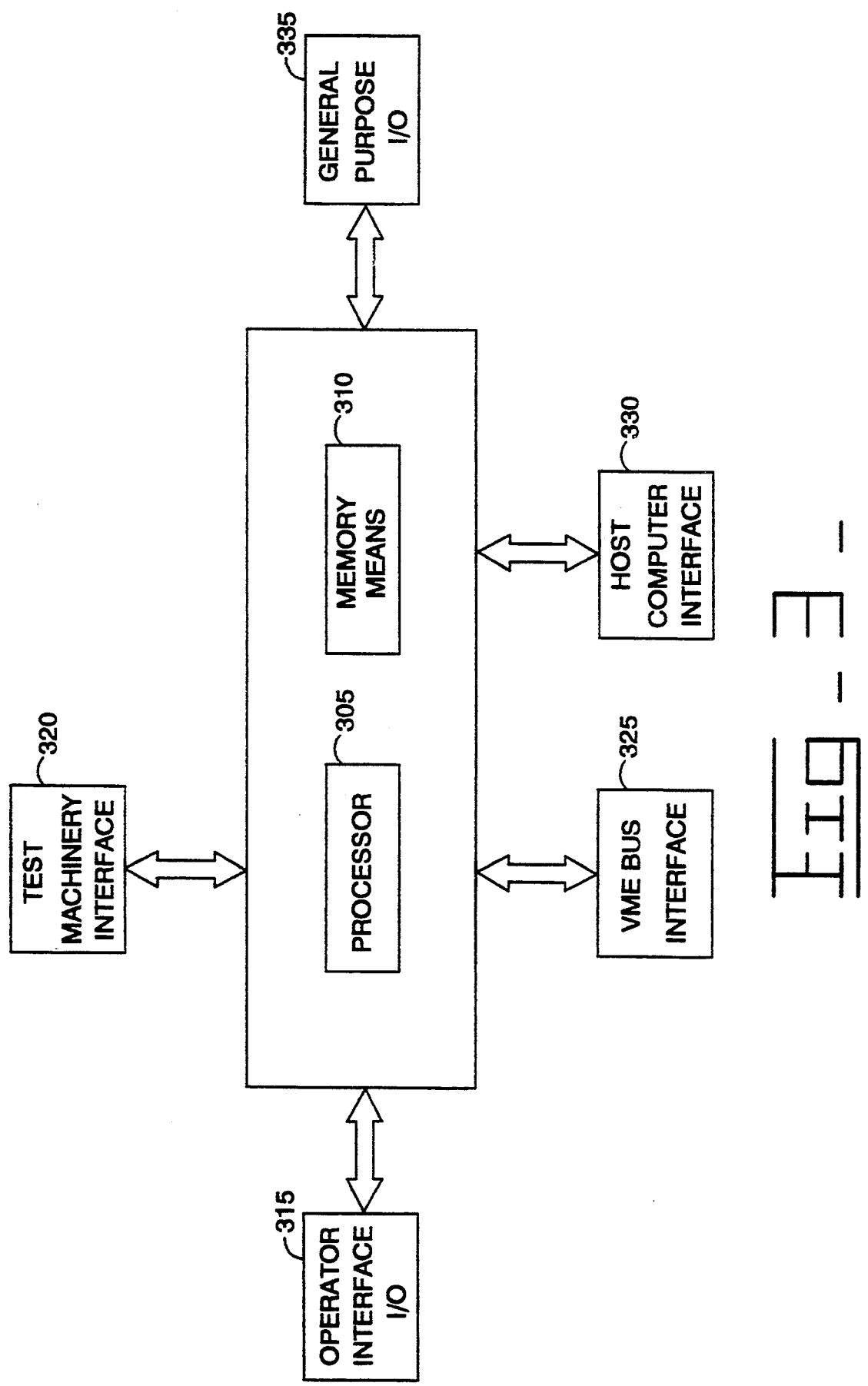
FIG. 3 is a block diagram illustrating the architecture of the processing means of FIG. 1 including an operator interface; according to an embodiment of the present invention.

The processing means 125 will now be discussed with reference to FIG. 3. The processing means 125 includes a programmable microprocessor 305 similar to that provided by Texas Instruments as model no. TMS320C30. This particular type of microprocessor has digital signal processing capability. In the preferred embodiment, a real-time operating system (OS) provides the working environment for the microprocessor 305. One suitable OS is the SPOX-OS Real Time Operating System available from Spectron Microsystems of Santa Barbara, Calif.

The processing means 125 also includes a memory means 310. The memory means 310 is used to store software programs, parameters, etc. The memory means 310 may include four types of memory, listed below.

EEPROM Setup parameters, Cycle file storage

Sectored Flash Memory Bootup routine, Executable storage

Static RAM (25ns) Zero-Wait-State run-time access for executable

Dynamic RAM Processor "stack", Dynamic Allocation Heap, Temporary File Storage, Scratch-pad memory.

The processing means 125 communicates with the outside word via a number of interfaces.

An operator interface I/O 315 provides a data link between the microprocessor 305 and the operator.

A test machinery interface 320 relays information between the rotating machinery 105 and the microprocessor 305. As discussed above, the input may be processed through signal conditioning circuitry. Additionally, the test interface 320 may include up to four channels, each channel providing a distinct torsional measurement.

A host computer interface 330 provides the apparatus 100 with the capability of communicating with a host computer via a RS-232 or an IEEE-488 port.

A Versa Module Europe (VME) bus interface 325 provides access to expansion peripherals, for example, disk drives, networking cards, graphics cards, additional processors, printer ports, analog to digital converters, digital to analog converters, a counter/timer, and/or extended memory.

A general purpose I/O 335 may also be included to provide additional communication.

Figure 4:
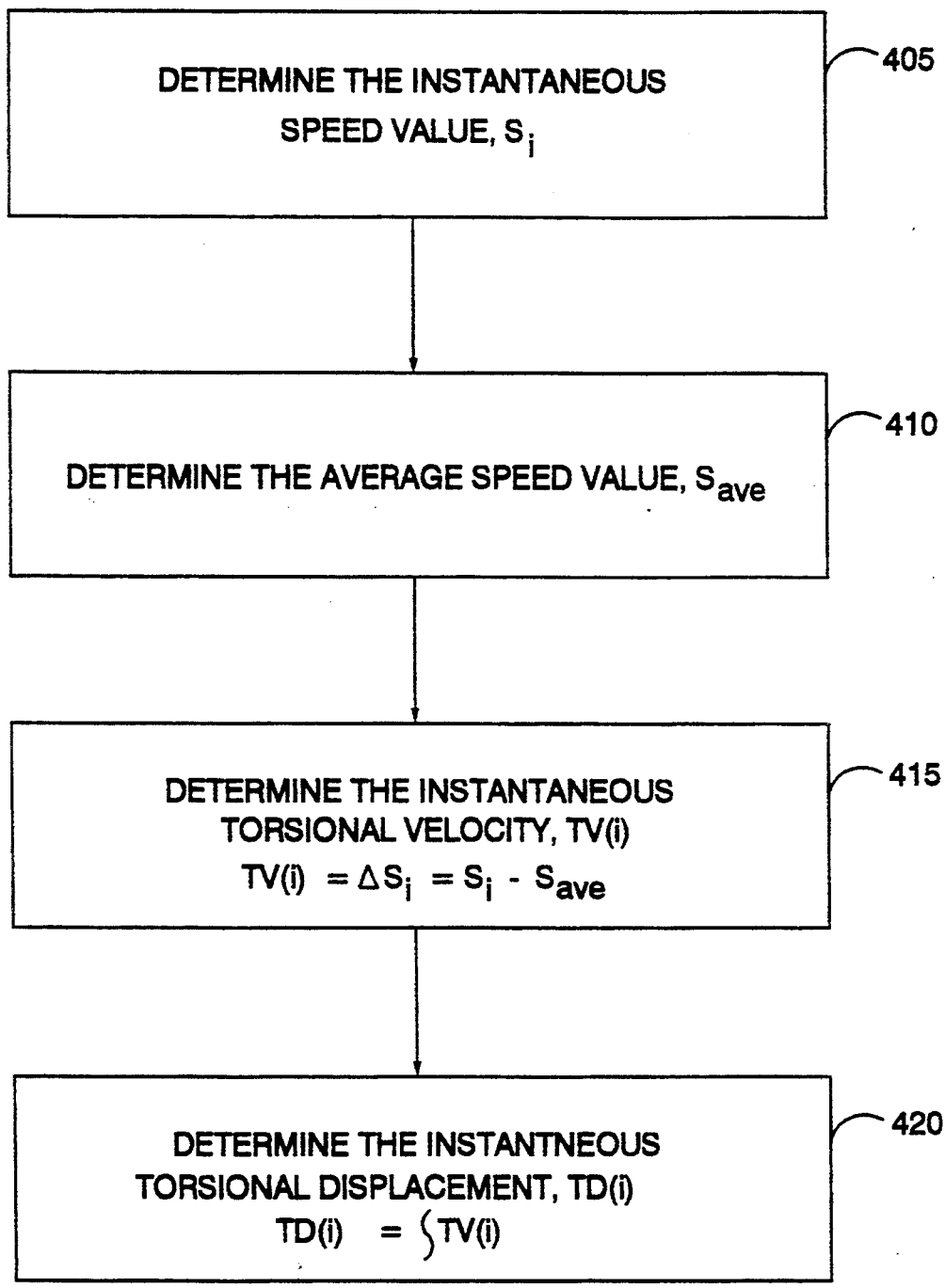
FIG. 4 is a flowchart illustrating a computer software program for implementing an embodiment of the present invention.

FIG. 4 is a flowchart illustrating a computer software program for implementing the preferred embodiment of the present invention. The program depicted in the flowchart is particularly well adapted for use with the microprocessor and associated components described above, although any suitable microprocessor may be utilized in practicing an embodiment of the present invention. The flowchart constitutes a complete and workable design of the preferred software program. The software program may be readily coded from these detailed flowcharts using the instruction set associated with this system, or may be coded with the instructions of any other suitable conventional microcomputer. The process of writing software code from a flowchart such as this is a mere mechanical step for one skilled in the art.

For example, at block 405 the processing means 125 determines the instantaneous speed value, $S_i$. The instantaneous speed value represents the rotational speed of the wheel in RPM. The instantaneous speed value, $S_i$, is determined in response to the following equation:

$$S_i = K/T_i$$

where Ti represents the instantaneous period value and K represents a constant. The constant, K, is calculated by the equation K=(60 seconds/X), where X represents the number of wheel teeth. Alternately, if the sensor 105 comprises an optical encoder, X would represent the number of pulses that the sensor produces per wheel revolution.

Figure 5:
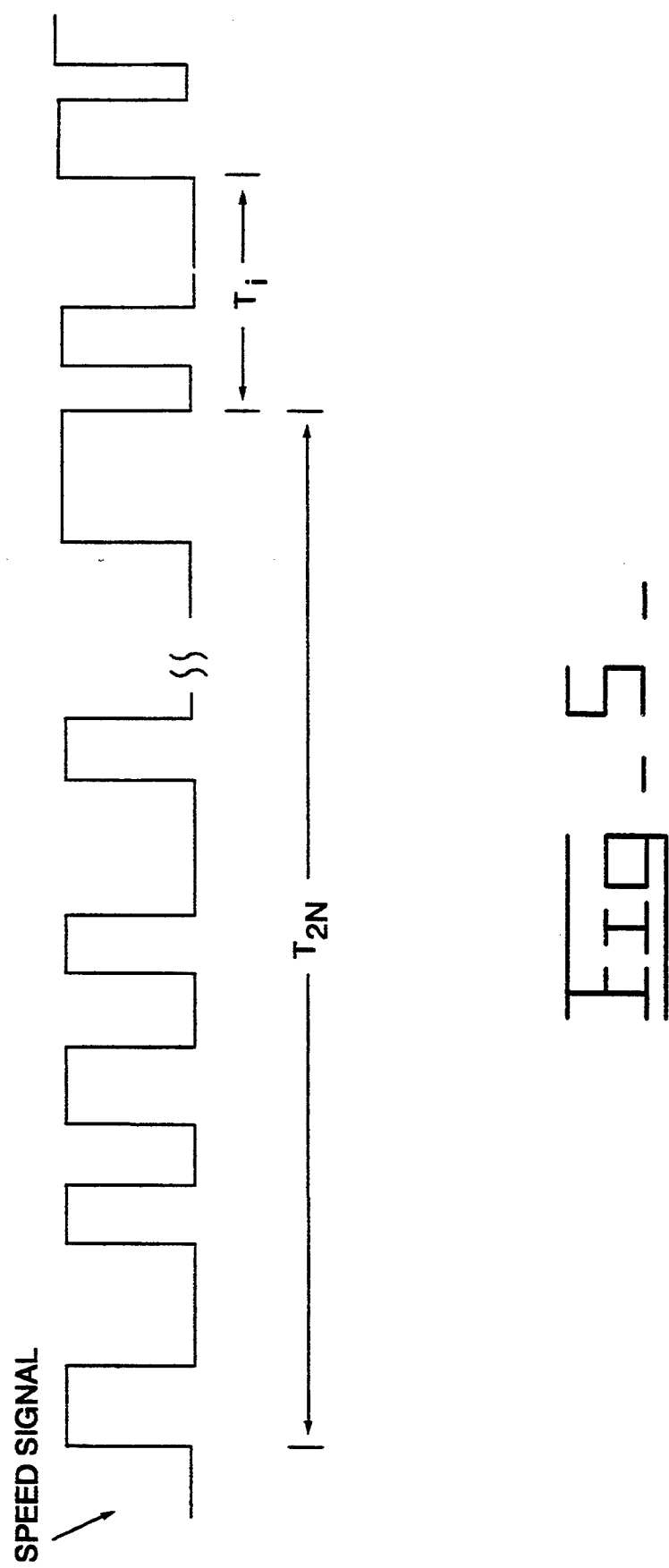
FIG. 5 is a diagram illustrating a speed signal associated with an embodiment of the present invention.

At block 410, the processing means 125 determines the average speed value, $S_{ave}$. The average speed value, $S_{ave}$, is determined in response to the following equation:

$$S_{ave} = \frac{k}{T_{ave}}$$

where, $$T_{ave} = \frac{1}{2N} \sum_{y=1}^{2N} T_i(y)$$

and N represents the number of wheel revolutions. As shown by the equation, the average speed is a function of the summation of the instantaneous speed values for the last two wheel revolutions (2N). Additionally, the average speed value is updated at each occurring pulse of the speed signal. Thus, the average speed value is said to be a "moving" average. Referring to FIG. 5, the speed signal is represented during the last two wheel revolutions.

Adverting back to FIG. 4 at block 415, the processing means 125 determines the instantaneous torsional velocity value, TV(i). The instantaneous torsional velocity value, TV(i) is determined from the difference of the instantaneous speed value, $S_i$, and the average speed value, $S_{ave}$.

Figure 6:
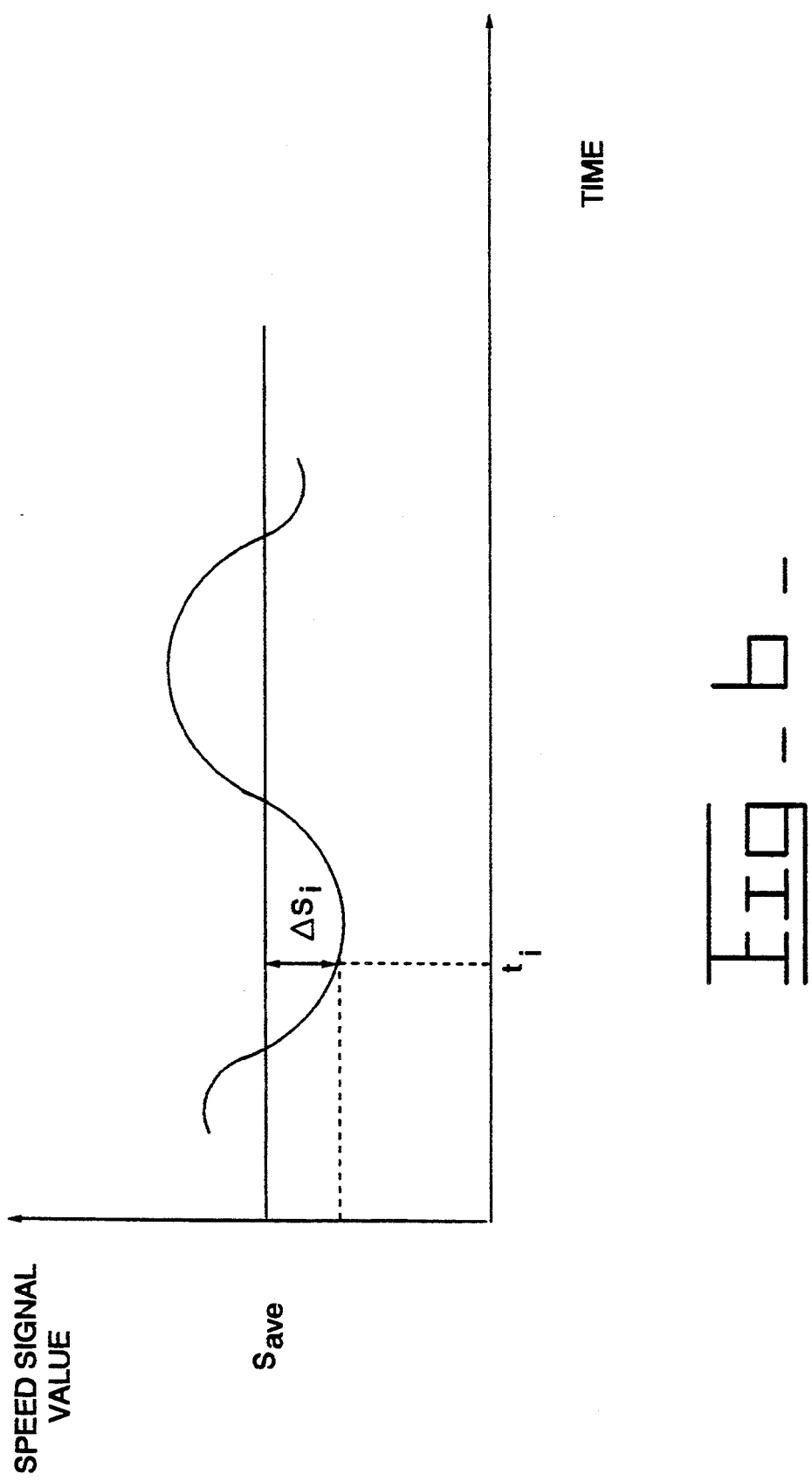
FIG. 6 is a diagram illustrating the magnitude of the speed signal.

Referring now to FIG. 6, the above relationship is shown graphically. For example, the magnitude of the speed signal is illustrated over a predetermined time period. It is well known that torsional vibrations cause fluctuations in the angular velocity of a rotating object. Thus, any deviations from the average speed are proportional to the torsional velocities. Here, Delta $S_i$ represents an instantaneous torsional velocity. Hence, the instantaneous torsional velocity, TV(i) is determined in response to the following equation:

$$TV(i) = k\left(\frac{1}{T_i} - \frac{1}{T_{ave}}\right)$$

Referring again to FIG. 4 and at block 420, the processing means 125 determines the instantaneous torsional displacement value, TD(i), by integrating the instantaneous torsional displacement. Here, the integration is perform numerically. Referring to FIGS. 7 and 8 the following equation is derived:

$$TD(i) = \int_0^t TV(t)\,dt$$
$$= A_1 + A_2$$

Where $A_1$=Left-Hatched Area (the previous torsional displacement, TD(i−1))

$A_2$=Right-Hatched Area (the area of the trapezoid shown in FIG. 8)

$A_2 = \frac{1}{2}(t+b) \times h$

Therefore, $A_2 = \frac{1}{2}(TV(i) + TV(i-1)) \times T_i$

Finally, $TD(i) = TD(i-1) + (\frac{1}{2}(TV(i) + TV(i-1)) \times T_i \times K') - TD_{ave}$ Where
TD(i)=Instantaneous Torsional Displacement
TD(i-1)=Previous Torsional Displacement
TV(i)=Instantaneous Torsional Velocity
TV(i-1)=Previous Torsional Velocity
$T_i$=Instantaneous Period
K'=Displacement Gain—To convert RPM to Degrees
TD=Average Torsional Displacement Note, $TDav_e$ is used to remove any "drifting" from the output.

Industrial Applicability

As earlier stated, the present invention is well suited to measure torsional vibrations of many types of rotating machinery. For example, assume the wheel 105 comprises an engine flywheel. Torsional vibrations produced by the engine causes the angular velocity of the flywheel to change. This change in velocity is denoted by the change in the frequency of the speed signal. The present invention uses digital technology to perform the above calculations to determine the magnitude of the torsional vibrations.

Figure 9:
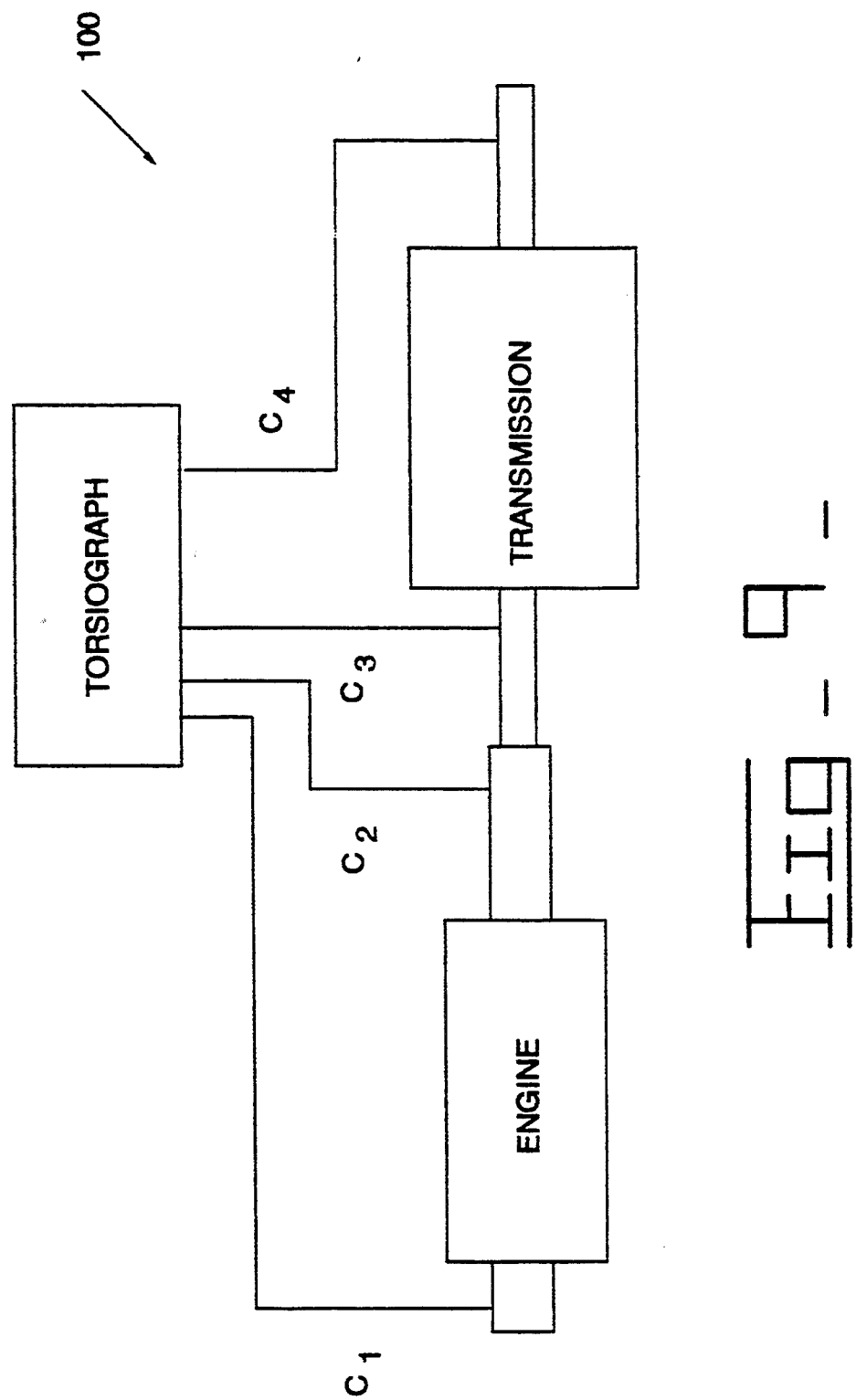
FIG. 9 is a block diagram of an engine/transmission interface associated with an embodiment of the present invention.

The present invention allows many torsional measurements to occur simultaneously. For example, an operator may desire to perform a plurality of torsional measurements on a mechanical system. Advantageously, the present invention includes four channels ($C_1$-$C_4$) to conduct torsional measurements. As shown in FIG. 9, four channels are used to measure torsional vibrations at an engine/transmission interface. Since the present invention is based on digital technology the measurements can be accomplished on a timely basis providing for high accuracy.

Figure 10:
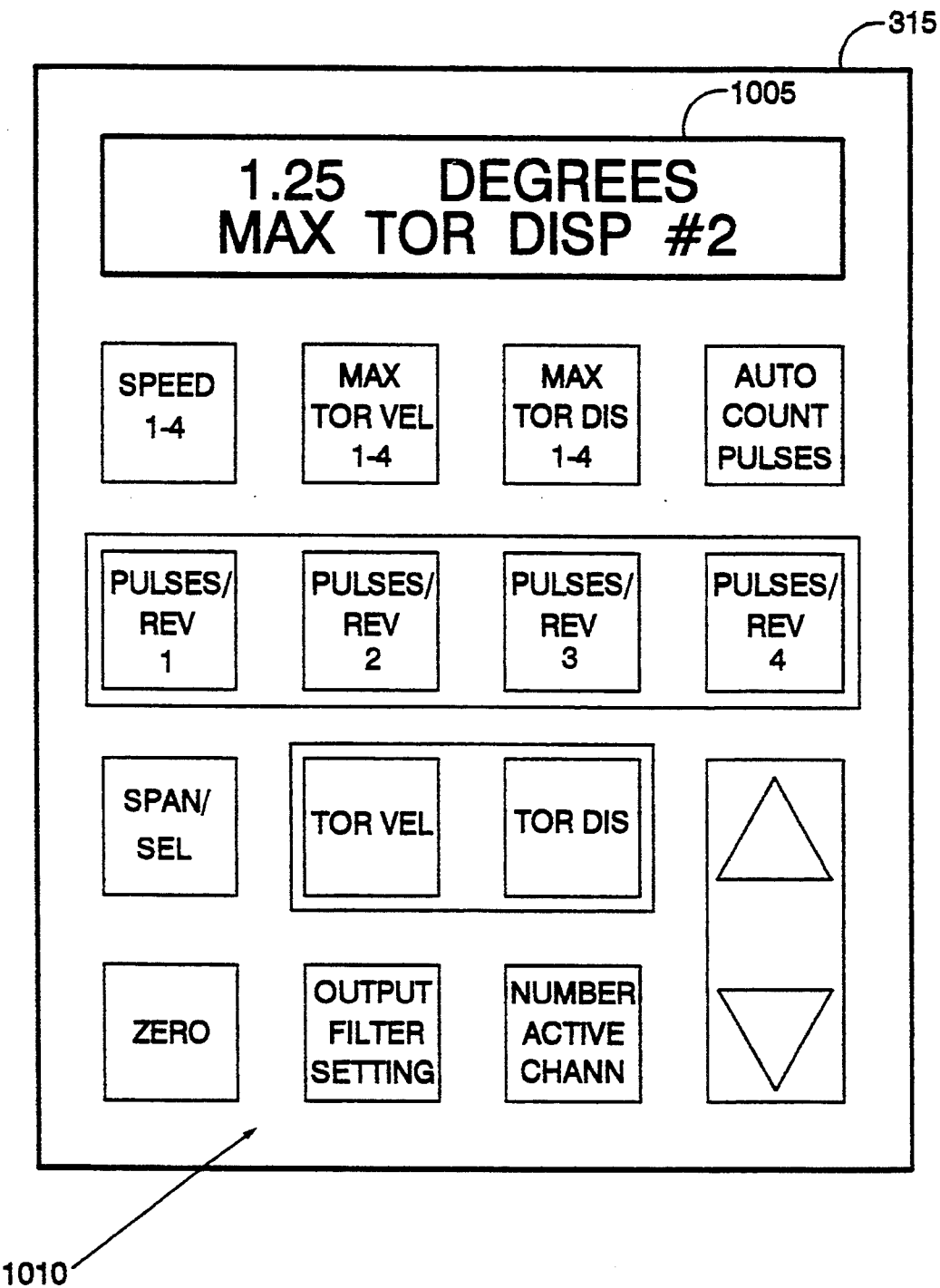
FIG. 10 is a representation of an operator interface of FIG. 3 associated with an embodiment of the present invention.

An example of performing a test will now be discussed in relation to FIG. 10. FIG. 10 represents the operator interface 315, which includes an Liquid Crystal Display (LCD) 1005 to view testing information, and a key pad 1010 that has a plurality of operator settings. The operator interface 315 allows the operator to input data to set-up the test and provides a visual feedback that allows the operator to monitor the test. To initiate a test the operator enters set-up information for each channel via the key pad 1010. For example, the set-up information may include the number of gear-teeth on the wheel 105 or the number of pulses per revolution produced by an optical sensor. Once the setup is complete, the test may begin. The conditioning circuitry 115 receives the speed signal associated with each channel and responsively converts speed signals having arbitrary waveforms into clearly defined pulse trains. The speed signal pulse trains are delivered to the timing means 120. The timing means 120 determines the period of each speed signal pulse and delivers the pulse period to the processing means 125. Using the calculations described above, the processing means 125 produces torsional signals representative of the torsional velocity and displacement associated with each channel.

The operator can request via the key pad 1010 to display the maximum velocity or displacement of a particular channel on the LCD 1005. For example, as shown on FIG. 10 the maximum torsional displacement for channel #2 is shown to be 1.25°. Further, the torsional signals may be recorded "real-time" on strip chart paper for subsequent analysis.

As described, the present invention takes advantage of digital technology to accurately measure torsional vibrations of rotating machinery. The resulting data can therefore be used by engineers to analyze the data to aid in the design of high quality machinery.

Other aspects, objects and advantages of the present invention can be obtained from a study of the drawings, the disclosure and the appended claims.

I claim:

1. An apparatus for measuring torsional vibrations of rotating machinery, comprising:
   a wheel having a plurality of spaced apart teeth being connected to and rotating with the rotating machinery;
   a sensor adapted to detect the speed of rotation of the wheel and responsively produce a speed signal having a frequency proportional to the rotational speed of the wheel, the speed signal having a periodic pulse;
   timing means for receiving the speed signal, determining the period of the most recent pulse of the speed signal, and responsively producing an instantaneous period signal having a value representative of the determined period; and
   processing means for receiving the instantaneous period signal, determining an instantaneous speed value of the rotating wheel in response to the value of the instantaneous period signal, determining an average speed value of the rotating wheel based on previous wheel rotations in response to the instantaneous speed value, producing an instantaneous torsional velocity signal having a value equal to the difference of the average speed value and the instantaneous speed value, and producing an instantaneous torsional displacement signal having a value responsive to the integration of the torsional velocity signal value.

2. An apparatus, as set forth in claim 1, wherein the processing means includes means for determining the instantaneous speed value, $S_i$, in response to the following equation:

$$S_i = K/T_i$$

where $T_i$ represents the instantaneous period value and K represents a constant.

3. An apparatus, as set forth in claim 2, wherein the processing means including means for determining the average speed value, $S_{ave}$, in response to the following equation:

$$S_{ave} = \frac{k}{T_{ave}}$$

where, $$T_{ave} = \frac{1}{2N} \sum_{y=1}^{2N} T_i(y)$$

and N represents the number of wheel revolutions.

4. An apparatus, as set forth in claim 3, wherein the processing means includes means for determining the instantaneous torsional velocity value, TV(i), by the following equation:

$$TV(i) = k \left( \frac{1}{T_i} - \frac{1}{T_{ave}} \right).$$

5. An apparatus, as set forth in claim 4, wherein the processing means includes means for determining the instantaneous torsional displacement value, TD(i), in response to the following equation:

TD(i)=TD(i−1)+(½(TV(i)+TV(i−1))×$T_i$×K')−$TD_{ave}$

Where
   TD(i)=Instantaneous Torsional Displacement
   TD(i−1)=Previous Torsional Displacement
   TV(i)=Instantaneous Torsional Velocity
   TV(i−1)=Previous Torsional Velocity
   $T_i$=Instantaneous Period
   K'=Displacement Gain—To convert RPM to Degrees
   $TD_{ave}$=Average Torsional Displacement.

6. An apparatus, as set forth in claim 5, wherein each pulse of the speed signal is defined by rising and falling edges, the timing means includes:
   means for producing a clock signal having a periodic pulse train; and
   means for counting the number of pulses of the clock signal that occur between the falling edges of the speed signal, the number of clock signal pulses representing the instantaneous period signal value.

7. An apparatus, as set forth in claim 6, including a conditioning circuit adapted to receive the speed signal and responsively condition the speed signal.

8. An apparatus, as set forth in claim 7, including a Digital to Analog signal converting device adapted to receive the instantaneous torsional velocity and displacement signals and convert the instantaneous torsional signals from digital signals to analog signals.

9. An apparatus, as set forth in claim 8, wherein the processing means includes a digital signal processor.

10. An apparatus, as set forth in claim 9, including an output device adapted to receive the instantaneous torsional velocity and displacement signals and display the representative values thereof.

11. A method for measuring torsional vibrations of rotating machinery, comprising the steps of:
   sensing the speed of rotation of the rotating machinery and responsively producing a speed signal having a frequency proportional to the rotational speed of the rotating machinery, the speed signal having a periodic pulse;
   receiving the speed signal, determining the period of the most recent pulse of the speed signal, and responsively producing an instantaneous period signal having a value representative of the determined period; and
   receiving the instantaneous period signal, determining an instantaneous speed value of the rotating machinery in response to the value of the instantaneous period signal, determining an average speed value of the rotating machinery based on previous machinery rotations in response to the instantaneous speed value, producing an instantaneous torsional velocity signal having a value equal to the difference of the average speed value and the instantaneous speed value, and producing an instantaneous torsional displacement signal in response to numerically integrating the torsional velocity signal value.

12. A method, as set forth in claim 11, including the step of determining the instantaneous speed value, $S_i$, in response to the following equation:

$$S_i = K/T_i$$

where $T_i$ represents the instantaneous period value and K represents a constant.

13. A method, as set forth in claim 12, including the step of determining the average speed value, $S_{ave}$, in response to the following equation:

$$S_{ave} = \frac{k}{T_{ave}}$$

where, $$T_{ave} = \frac{1}{2N} \sum_{y=1}^{2N} T_i(y)$$

and N represents the number of wheel revolutions.

14. A method, as set forth in claim 13, including the step of determining the instantaneous torsional velocity value, TV(i), in response to the following equation:

$$TV(i) = k\left(\frac{1}{T_i} - \frac{1}{T_{ave}}\right).$$

15. A method, as set forth in claim 14, including the step of determining the instantaneous torsional displacement value, TD(i), in response to the following equation:

$$TD(i) = TD(i-1) + (\tfrac{1}{2}(TV(i) + TV(i-1)) \times T_i \times K') - TD_{ave}$$

Where
 TD(i) = Instantaneous Torsional Displacement
 TD(i−1) = Previous Torsional Displacement
 TV(i) = Instantaneous Torsional Velocity
 TV(i-1) = Previous Torsional Velocity
 $T_i$ = Instantaneous Period
 K = Displacement Gain—To convert RPM to Degrees
 $TD_{ave}$ = Average Torsional Displacement.

* * * * *